United States Patent [19]

Deusser et al.

[11] Patent Number: 5,384,194
[45] Date of Patent: Jan. 24, 1995

[54] SURFACE-MODIFIED PYROGENICALLY PRODUCED ALUMINUM OXIDE

[75] Inventors: Hans Deusser, Karlstein; Dieter Kerner, Hanau; Jürgen Meyer, Stockstadt; Günther Michael, Karlstein; Andreas Stubbe, Rodenbach, all of Germany

[73] Assignee: DeGussa Aktiengesellschaft, Frankfurt am Main, Germany

[21] Appl. No.: 12,163

[22] Filed: Jan. 28, 1993

[30] Foreign Application Priority Data

Jan. 31, 1992 [DE] Germany ............... 4202694

[51] Int. Cl.$^6$ .................................. B32B 1/00
[52] U.S. Cl. ................... 428/405; 428/402; 428/403; 428/447
[58] Field of Search ........... 428/403, 402, 447, 702, 428/689, 405; 430/110

[56] References Cited

U.S. PATENT DOCUMENTS

| | | | |
|---|---|---|---|
| 4,618,556 | 10/1986 | Takenouchi | 430/110 |
| 4,640,882 | 2/1987 | Mitsuhashi et al. | 430/110 |
| 4,652,509 | 3/1987 | Shirose et al. | 430/110 |
| 4,715,986 | 12/1987 | Grüning et al. | 252/315.2 |
| 4,828,954 | 5/1989 | Hashimoto et al. | 430/110 |
| 4,845,004 | 7/1989 | Kobayashi | 430/110 |
| 5,102,763 | 4/1992 | Winnik et al. | 430/110 |
| 5,182,173 | 1/1993 | Swei | 428/391 |

FOREIGN PATENT DOCUMENTS

| | | |
|---|---|---|
| 3516937 | 11/1985 | Germany . |
| 4202694 | 7/1993 | Germany . |
| 58-185405 | 10/1983 | Japan . |
| 59-45906 | 3/1984 | Japan .................. 428/405 |

OTHER PUBLICATIONS

German Office Action, with attached translation in English.

*Primary Examiner*—Patrick J. Ryan
*Assistant Examiner*—Marie R. Macholl
*Attorney, Agent, or Firm*—Cushman, Darby & Cushman

[57] ABSTRACT

Surface-modified, pyrogenically produced aluminum oxide which has the following physico-chemical properties:

| Surface | (m$^2$/g) | 50 to 150 |
|---|---|---|
| Stamping density | (g/l) | 50 to 90 |
| Drying loss | (%) | <5 |
| Annealing loss | (%) | 5.0 to 15 |
| C content | (%) | 0.5 to 12 |
| pH | | 4 to 8. |

3 Claims, 1 Drawing Sheet

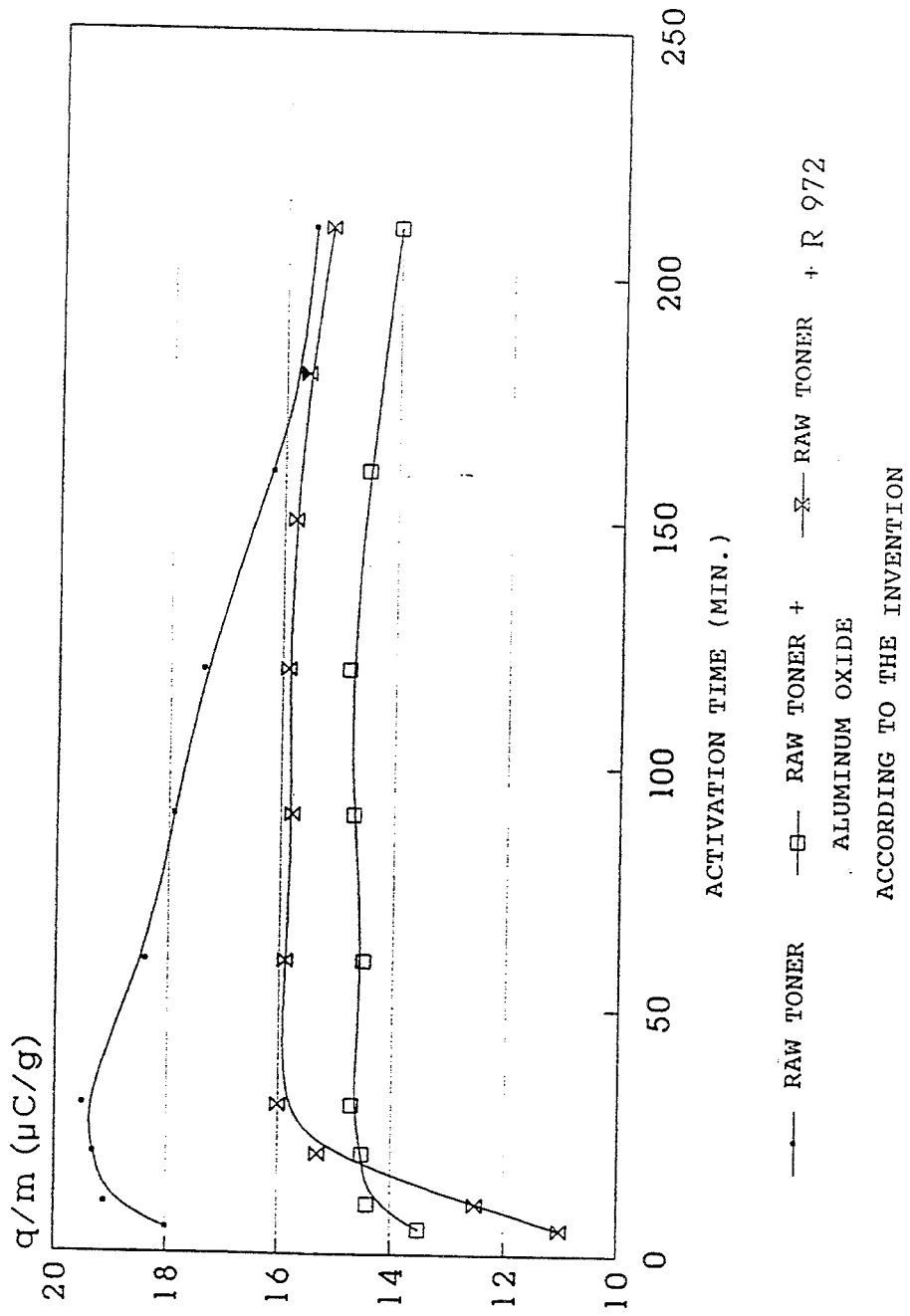

SURFACE-MODIFIED PYROGENICALLY PRODUCED ALUMINUM OXIDE

The present invention relates to a surface-modified, pyrogenically produced aluminum oxide.

BACKGROUND OF THE INVENTION

It is known to use powdery toners containing pyrogenically produced surface-modified silicon dioxide in electrostatic developing processes. Various silanes, especially dimethyldichlorosilane are used for surface modification (See U.S. Pat. No. 3,720,617).

It is also known that pyrogenically produced silicon dioxide waterproofed with compounds of the general formula

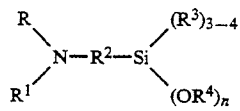

can be added to positively chargeable resin powders in order to increase their flowability (See published European Patent Application EP-A 0,293,009).

Published German Patent Application DE-A 12 09 427 discloses aluminum oxide whose surface has been modified with halogen silanes can be added to electrographic developing powders.

Published German Patent Application DE-A 34 26 685 (Canon) teaches the addition of aluminum oxide to positively chargeable toners in which the aluminum oxide has been treated simultaneously with the adhesion promoter γ-aminopropyltriethoxy-silane and trimethylethoxysilane.

A similarly treated aluminum oxide is described in Published Japanese Patent Application JP-OS 31442 (Nippon Aerosil Corporation).

The known method has the disadvantage that it must use an organic solvent system. Alcohols, hydrocarbons and halogenated hydrocarbons are used as solvents which cannot be completely removed from the reaction product.

SUMMARY OF THE INVENTION

The object of the present invention is to avoid these problems and produce a solvent-free, waterproofed aluminum oxide.

The present invention provides a surface-modified, pyrogenically produced aluminum oxide which is surface modified with a silane mixture consisting of silane A (trimethoxyoctylsilane) and silane B (3-aminopropyltriethoxysilane) having the chemical formulas:

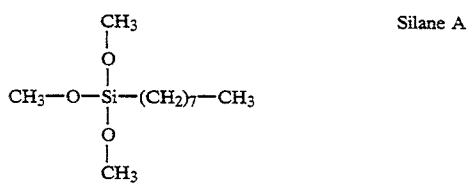

The surface-modified, pyrogenically produced aluminum oxide has the following physico-chemical properties:

| | |
|---|---|
| Surface (m$^2$/g) | 50 to 150 |
| Stamping density (g/l) | 50 to 90 |
| Drying loss (%) | <5 |
| Annealing loss (%) | 0.5 to 15 |
| C content (%) | 0.5 to 12 |
| pH | 4 to 8. |

The present invention also provides a method of producing the surface-modified, pyrogenically produced aluminum oxide in which the pyrogenically produced aluminum oxide is placed in a mixer and sprayed, with the mixer running, with the mixture of silane A and silane B. The silane and aluminum oxide are mixed after the addition of the silane mixture and the resulting mixture is tempered at 100° to 150° C., preferably at 115° to 125° C.

The ratio of aluminum oxide to silane mixture can be 0.5 to 40 parts by weight silane mixture per 100 parts by weight aluminum oxide.

The silane mixture can consist of 1 to 99 parts by weight silane A and 99 to 1 parts by weight silane B.

A mixture can be used with preference consisting of 50±20 parts by weight silane A and 50±20 parts by weight silane B.

A particularly suitable aluminum oxide is Aluminum Oxide C which is produced pyrogenically from aluminum trichloride by flame hydrolysis in an oxyhydrogen flame and which has the following physico-chemical characteristics:

| | Al$_2$O$_3$ C |
|---|---|
| Appearance | |
| Surface according to BET m$^2$/g | 100 ± 15 |
| Average size of the primary particles nanometer | 20 |
| Stamping density[1] g/l | — |
| Drying loss[2] (2 hours at 105° C.) % | <5 |
| Annealing loss[2][6] (2 hours at 1000° C.) % | <3 |
| pH[3] (in 4% aqueous dispersion) | 4–5 |
| SiO$_2$[5] % | <0.1 |
| Al$_2$O$_3$[5] % | >99.6 |
| Fe$_2$O$_3$[5] % | <0.02 |
| TiO$_2$[5] % | <0.1 |
| HCl[5][7] % | <0.5 |
| Sieve residue[4] according to Mocker (45 m) | <0.05 |
| packing drum size (net) | |
| normal goods kg | 5 |
| compressed goods (additive "V") kg | |

Technical data of the AEROSIL standard types
[1] according to DIN 53 194
[2] according to DIN 55 921
[3] according to DIN 53 200
[4] according to DIN 53 580
[5] relative to the substance annealed 2 hours at 1000° C.
[6] relative to the substance dried 2 hours at 105° C.
[7] HCl content is a component of the annealing loss The waterproofed aluminum oxide of the invention has the advantage that it has no solvent components. It can be used in toners for copiers,

DETAILED DESCRIPTION OF PREFERRED EMBODIMENTS

The following examples illustrate the invention.

Example 1

2 kg Al$_2$O$_3$ C produced pyrogenically from aluminum trichloride in an oxyhydrogen flame and having the properties given above are placed in a 135 liter Lodige mixer and sprayed with 100 g of a silane mixture consisting of 50 g trimethoxyoctylsilane and 50 g 3-aminopropyltriethoxysilane with the mixer running. The mixture is mixed for 15 minutes more. The silanized oxide is tempered 2 hours at 120° C.

Physico-chemical properties of the surface-modified aluminum oxide

| Carrier | Al$_2$O$_3$ C |
|---|---|
| Surface (m$^2$/g) | 92 |
| Stamping density (g/l) | 70 |
| Drying loss (%) | 0.9 |
| Annealing loss (%) | 5.3 |
| C content (%) | 2.9 |
| pH | 5.7 |

Example 2

|  | Unit | Theoretical value |
|---|---|---|
| Melt flow Index[1] (150° C./2, 16 kp) | g/10 min | 5–10 |
| Viscosity number[2] | cm$^3$/g | 37–43 |
| Weight loss[3] | % by weight | <1 |
| Residual monomers[4] | % by weight | <0.35 |
| Styrene |  | <0.25 |
| n-BMA |  | <0.10 |
| Other product properties: |  |  |
| Monomer composition |  | 70% by weight styrene 30% by weight n-butylmethacrylate |
| Glass transition temperature Tg[5] |  | 60–65° C. |
| Average grain diameter[6] (d 50% RS) |  | 0.200–0.314 mm |

[1] DIN 53 735, 2/88 edition
Specimen pretreatment: Drying at 50° C. oil pump vacuum, 1 hour or 4 hours drying oven, 50° C.
[2] DIN 7745, 1/80 edition
[3] IR drier until weight constancy
[4] Gas chromatography
[5] DSC method, ASTM D 3418/75
[6] DIN 53 734, 1/73 edition, evaluation according to DIN 66 141, 2/74 edition

| | | | | RCF (regular color furnace) density: (g/cm$^3$) 1.8–1.9 | | | | |
|---|---|---|---|---|---|---|---|---|
| | | | | Product specifications | | | | |
| | | Depth of Color | Color Strength | DBP Adsorption (mg/100 g) powder beads | | Volatile Components | | Extract contents toluene | Sieve Residue |
| Printex 35 RCF | Class | M$_\gamma$-value | IRB 3 = 100 | Powder | Beads | (%) | pH | (%) | (%) |
| Furnace Blacks Printex 35 | RCF | 236 | 100 | 42 | 42 | 0.9 | 9.5 | <0.1 | 0.05 |

| | | Further technical data | | | |
|---|---|---|---|---|---|
| | Ashing | Stamping Density | | Particle | BET Surface |
| Printex 35 RCF | Residue | Powder | Beads | Size (nm) | (m$^2$/g) |
| Furnace Blacks Printex 35 | 0.3 | 420 | 550 | 31 | 65 |

The aluminum oxide waterproofed according to Example 1 is tested in a positive toner system. The toner system consists of the following components:

| Pigment black Printex 35 | 7% |
|---|---|
| Copy-Blau PR (Hoechst AG) | 3% |
| Toner resin | 90% |

The repeated activation was tested with this toner and a high charge stability in comparison to the raw toner was determined (see FIG. 1).

Copy-Blau PR is a charge regulating agent for positive toners. It is characterized as follows:

Area of Application

1. Charge regulating agents for positive toners (1- or 2-component toners for copiers or laser printers)
2. Clearing agents for black toners Chemical characterization: triphenylmethane derivative
Thermal resistance: >200° C.
Solubility: insoluble in water slightly soluble in organic solvents The toner resin used is characterized as follows:

The q/m measurement takes place under the following conditions:
98% carrier (spherical ferrite (80–100 m))
2% aluminum oxide according to Example 1
Activation: Rolling fixture, 360 rpms in 40 ml glass bottle, weighed portion 40 g, developer

BRIEF DESCRIPTION OF FIGURES OF DRAWING

In the drawing, the FIGURE is a graph of q/m versus activation time.

What is claimed is:

1. A pyrogenically produced aluminum oxide which has been surface modified with a mixture of silane A and silane B corresponding to the chemical formulae:

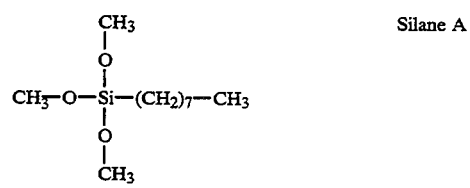

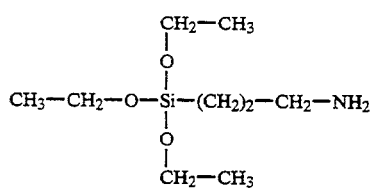 Silane B said surface-modified, pyrogenically produced aluminum oxide having the following physico-chemical properties:

| Surface | (m²/g) | 50 to 150 |
|---|---|---|
| Stamping Density | (g/l) | 50 to 90 |
| Drying loss | (%) | <5 |
| Annealing loss | (%) | 5.0 to 15 |
| C content | (%) | 0.5 to 12 |
| pH | | 4 to 8 | the ratio of aluminum oxide to silane mixture being in the range 0.5 to 40 parts by weight of silane per 100 parts by weight aluminum oxide.

2. A surface modified aluminum oxide as set forth in claim 1 in which, in the mixture of silane A and silane B, there are 1 to 99 parts by weight of silane A and 1 to 99 parts by weight of silane B, relative to each other.

3. A surface modified aluminum oxide as set forth in claim 2 in which, in the mixture of silane A and silane B, there are 50±20 parts by weight of silane A and 50±20 parts by weight of silane B, relative to each other.

* * * * *